(12) United States Patent
Shiozawa et al.

(10) Patent No.: US 11,041,760 B2
(45) Date of Patent: Jun. 22, 2021

(54) OPTICAL MEASUREMENT DEVICE AND OPTICAL MEASUREMENT METHOD

(71) Applicant: HITACHI HIGH-TECH CORPORATION, Tokyo (JP)

(72) Inventors: Manabu Shiozawa, Tokyo (JP); Koichi Watanabe, Tokyo (JP); Masataka Shirai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 90 days.

(21) Appl. No.: 15/556,190

(22) PCT Filed: Mar. 11, 2015

(86) PCT No.: PCT/JP2015/057090
§ 371 (c)(1),
(2) Date: Sep. 6, 2017

(87) PCT Pub. No.: WO2016/143084
PCT Pub. Date: Sep. 15, 2016

(65) Prior Publication Data
US 2018/0045571 A1   Feb. 15, 2018

(51) Int. Cl.
*G01J 3/44* (2006.01)
*G01N 21/65* (2006.01)
*G01J 3/02* (2006.01)

(52) U.S. Cl.
CPC ............ *G01J 3/4412* (2013.01); *G01J 3/0208* (2013.01); *G01J 3/0218* (2013.01); *G01J 3/0237* (2013.01); *G01N 21/65* (2013.01); *G01N 2021/653* (2013.01)

(58) Field of Classification Search
CPC ............. G01N 2021/653; G01N 21/65; G01N 2021/655; G01N 2021/656; G01J 3/44
See application file for complete search history.

(56) References Cited

U.S. PATENT DOCUMENTS 4,405,237 A * 9/1983 Manuccia ................. G01J 3/44
356/301
6,108,081 A    8/2000 Holtom et al.
(Continued)

FOREIGN PATENT DOCUMENTS

JP    2009-222531 A    10/2009
JP    2011-191496 A    9/2011
(Continued)

*Primary Examiner* — Kara E. Geisel
*Assistant Examiner* — Rufus L Phillips
(74) *Attorney, Agent, or Firm* — Miles & Stockbridge, P.C.

(57) ABSTRACT

In multiplex CARS, a fingerprint region is a region where signals are densely concentrated. Information about the intensities and spatial distribution of these signals is important in cell analysis. However, there has been a problem in that the signal intensities are low. Accordingly, mechanisms 702 and 703 for adjusting the power branching ratio between light that enters a photonic crystal fiber 705 and pumping light; mechanisms 710 and 711 for adjusting the divergence/convergence state of the pumping light; and mechanisms 706 and 2101 for adjusting the divergence/convergence state of Stokes light are provided to enable adjustment for emphasizing a desired wavelength band.

4 Claims, 16 Drawing Sheets

(56) References Cited

U.S. PATENT DOCUMENTS

| | | | |
|---|---|---|---|
| 2003/0174326 A1* | 9/2003 | Rzasa | G01J 3/02 356/326 |
| 2007/0088219 A1* | 4/2007 | Xie | A61B 5/0066 600/473 |
| 2008/0059135 A1* | 3/2008 | Murugkar | G01J 3/4338 703/11 |
| 2008/0291443 A1* | 11/2008 | Malinovskaya | G01N 21/65 356/301 |
| 2010/0174145 A1* | 7/2010 | Lee | A61B 5/0066 600/182 |
| 2011/0128538 A1* | 6/2011 | Cerullo | G01J 3/44 356/301 |
| 2011/0164246 A1* | 7/2011 | Riddell | G01N 15/1459 356/301 |
| 2012/0250013 A1 | 10/2012 | Tamada | |
| 2012/0287428 A1 | 11/2012 | Tamada | |
| 2013/0021606 A1* | 1/2013 | Rigneault | G01N 21/65 356/301 |
| 2014/0204378 A1* | 7/2014 | Day | G01J 3/2823 356/326 |
| 2015/0276483 A1 | 10/2015 | Mikami | |
| 2016/0178439 A1* | 6/2016 | Freudiger | G01J 3/44 356/301 |

FOREIGN PATENT DOCUMENTS

| | | |
|---|---|---|
| JP | 2012-215411 A | 11/2012 |
| JP | 2012-237714 A | 12/2012 |
| WO | WO 2014/061147 A1 | 4/2014 |

\* cited by examiner

Bright field image

CARS image
(1650cm$^{-1}$, Amide I)

OPTICAL MEASUREMENT DEVICE AND OPTICAL MEASUREMENT METHOD

TECHNICAL FIELD

The present invention relates to an optical measurement device and an optical measurement method using coherent anti-Stokes Raman scattering.

BACKGROUND ART

An optical microscope been developed as an indispensable device in natural science, engineering, and industrial fields. Particularly, in recent years, there is an increasing need for functional improvement of the optical microscope for use in cell observation in regeneration medicine and drug discovery fields. Currently, a general method for a current cell analysis is to stain a cell with use of a reagent and observe the cell through the microscope. However, in this method, due to an effect that staining has on the cell, it is difficult to analyze the same cell continuously and to use the tested cell for medical use as it is.

A coherent anti-Stokes Raman scattering (CARS) microscope is suitable for use in cell observation since the CARS microscope enables molecular identification at higher speed than a Raman microscope due to application of a non-linear optical effect and has a non-invasive characteristic. Hereinbelow, the Raman scattering and the CARS will be described briefly. FIG. 1 is an energy level diagram of Stokes scattering in normal Raman scattering. The Raman scattering includes Stokes scattering and anti-Stokes scattering, and only the Stokes scattering is illustrated in FIG. 1. FIG. 1 illustrates a molecular ground state 101 and a vibrational excited state 102. When a molecule is irradiated with pumping light having a frequency of $\omega_P$, the molecule scatters light having a frequency of $\omega_S$ after going through an intermediate state 103. At this time, the molecule returns to one level in the vibrational excited state 102. The scattered light is Stokes light having a frequency of $\omega_S$, which is lower than the frequency of $\omega_P$ of the pumping light. The molecular vibrational excited state has a plurality of levels. Depending on the kind of the molecule, the level of the vibrational excited state differs, and the transition probability from the intermediate state to some level of the vibrational excited state differs. Thus, a spectrum specific to the molecule is formed. A Raman shift frequency $\Omega$ is expressed as $\Omega=\omega_P-\omega_S$ and has a positive value when the Raman scattering is the Stokes scattering. When the Raman scattering is the anti-Stokes scattering, an initial state is the molecular vibrational excited state 102, and the molecule returns to the ground state 101 after going through the intermediate state 103. In this case, when the frequency of the anti-Stokes light is referred to as $\omega_{AS}$, $\omega_P<\omega_{AS}$ is established. The anti-Stokes Raman scattered light is higher in frequency than the pumping light.

In the aforementioned Raman scattering, it takes time to measure the scattered light since the intensity of the scattered light is low. As a method enabling strong scattered light to be obtained, a spectroscopic method using the CARS, which is non-linear Raman scattering, can be raised. To generate CARS light, pulse laser having high peak power is used. The CARS generated by the pulse laser light is attributed to the non-linear optical effect, and the intensity of the CARS is orders of magnitude higher than the Raman scattering along with the increase of the peak power. Accordingly, a signal having a high signal-to-noise ratio can be obtained, and the measurement time can drastically be shortened.

In the CARS, light emitted based on third-order polarization. To generate the CARS, pumping light, Stokes light, and probe light are required. In general, to reduce the number of light sources, the pumping light is substituted for the probe light. In this case, induced third-order polarization is expressed as follows.

$$P_{AS}^{(3)}(\omega_{AS})=|x_r^{(3)}(\omega_{AS})+x_{nr}^{(3)}|E_P^2(\omega_P)E_S^*(\omega_S)$$

In this equation, $x_r^{(3)}(\omega_{AS})$ is a resonant term of a vibration of a molecule with the third-order electric susceptibility, and $x_{nr}^{(3)}$, which has no frequency dependence, is a non-resonant term. Also, the electric fields of the pumping light and the probe light are expressed as $E_P$, and the electric field of the Stokes light is expressed as $E_S$. In the above equation, the asterisk attached to $E_S$ illustrates complex conjugate. The intensity of the CARS light is expressed as follows.

$$I_{CARS}(\omega_{AS}) \propto |P_{AS}^{(3)}(\omega_{AS})|^2$$

FIG. 2 is an energy level diagram in the CARS. A mechanism in which CARS light is generated will be described with use of the molecular energy level diagram illustrated in FIG. 2. FIG. 2 illustrates a process or the resonant term. Similarly to FIG. 1, FIG. 2 illustrates the molecular ground state 101 and the vibrational excited state 102. A molecule is simultaneously irradiated with pumping light having a frequency of $\omega_P$ and Stokes light having a frequency of $\omega_S$. At this time, the molecule is excited to a level of the vibrational excited state 102 after going through the intermediate state 103. When the molecule being in the excited state is irradiated with probe light having a frequency of $\omega_P$, the molecule returns to the ground state while generating CARS light having a frequency of $\omega_{AS}$ after going through an intermediate state 104. The frequency of the CARS light at this time is expressed as $\omega_{AS}=2\cdot\omega_P-\omega_S$.

FIG. 3 illustrates a process related to the non-resonant term $x_{nr}^{(3)}$ of the third-order polarization. This is a process in which a state induced by simultaneous irradiation of a molecule with pumping light having a frequency of $\omega_P$ and Stokes light having a frequency of $\omega'_S$ is not the vibrational excited state but an intermediate state 105. When the molecule is irradiated with probe light having a frequency of $\omega_P$, the molecule generates non-resonant CARS light having a frequency of $\omega_{AS}$ after going through the intermediate state 104.

Among CARS microscopes, one that uses broadband light as Stokes light and that spectroscopically detects generated CARS light as illustrated in FIG. 4 is called a multiplex CARS microscope (or a multiplex CARS microscope). When the multiplex CARS microscope is used, a Raman spectrum can be estimated from a spectrum of the CARS light. Thus, using the multiplex CARS microscope can provide more information than using a method for detecting only a specific spectral component (such a method will be referred to as single-color CARS or single CARS for convenience) as in PTL 1 and is suitable for a more detailed analysis of a target to be measured.

FIG. 5 illustrates a configuration of a conventional multiplex CARS microscope. An output from a short pulse laser light source 501 is split into two beams by a beam splitter 502. One of the two beams is led into an optical fiber such as a photonic crystal fiber 503, and broadband light (called supercontinuum light) is generated in the optical fiber. After the supercontinuum light is emitted from the fiber, only components with a desired wavelength (components with a wavelength longer than that of excited light) are extracted from the supercontinuum light by a long-pass filter 504 and are used as Stokes light. The other excited light and the Stokes light are combined by a dichroic mirror 505 or the like, and the combined light is focused onto and emitted into a sample 506 to generate CARS light. The CARS light is detected by a spectroscope 507 to obtain a spectrum.

CITATION LIST

Patent Literature

PTL 1: U.S. Pat. No. 6,108,081
PTL 2: JP 2009-222531 A

SUMMARY OF INVENTION

Technical Problem

As described above, the multiplex CARS microscope employs a method in which CARS signals corresponding to a plurality of molecular vibrations can simultaneously be obtained, and the intensities of the signals significantly differ depending on the wavenumber band. FIG. 6 illustrates a conventional CARS spectrum and an example of a CARS spectrum of a fat cell. From the fat cell, a high CARS signal corresponding to CH stretch around 2900 cm$^{-1}$ is obtained, and signals of Amide III, CH bend, Amide I, and the like are obtained in a fingerprint region around 800 to 1800 cm$^{-1}$. The fingerprint region is a region where signals corresponding to respective molecular vibrations are densely concentrated. Information about the intensities and spatial distribution of these signals is important in cell analysis. However, as illustrated in FIG. 6, there is a problem in that the signal intensities are low. In particular, in a case in which a CARS spectrum image representing spatial distribution of a substance is obtained, it takes several minutes to several tens of minutes in measurement due to the low signal intensity.

Solution to Problem

The present inventors have discovered that a signal-to-noise ratio in a desired wavenumber band changes through adjustment in a multiplex CARS microscope.

First, the intensity of a CARS signal is proportional to the square of the intensity of pumping light and the first power of the intensity of Stokes light. Accordingly, in a case in which emitting light from one short pulse laser light source is split into the pumping light and incident light in a photonic crystal fiber, it is important to provide power to the pumping light while securing the intensity of the broadband light serving as the Stokes light. Also, the spectrum of the supercontinuum light changes depending on the intensity of the incident light in the photonic crystal fiber. Accordingly, the present inventors have discovered that an optimal value for a power branching ratio between the pumping light and the incident light in the photonic crystal fiber changes depending on the wavenumber band of required CARS light.

Second, a CARS process is one of nonlinear optical effects. Thus, it is important that the pumping light and the Stokes light focus on the same position in a sample. In a case of multiplex CARS, since the Stokes light is broadband, chromatic aberration due to an objective lens is generated. The present inventors have discovered that the spectrum of the generated CARS light is changed by adjustment in which the pumping light and the Stokes light are combined in the sample.

The present invention has been made based on these newly discovered phenomena. To solve the above first problem, an optical measurement device provided with a mechanism for adjusting a power branching ratio between pumping light and incident light in a photonic crystal fiber. Also, to solve the second problem, the optical measurement device is provided with a mechanism for adjusting (a) focal point(s) of broadband Stokes light and/or pumping light in a sample.

That is, an optical measurement device according to an aspect of the present invention includes: a short pulse laser light source; a splitting unit configured to split emitting light from the short pulse laser light source into a first light flux and a second light flux; an optical fiber configured to generate supercontinuum light from the first light flux; a combining unit configured to combine a long wavelength component of the supercontinuum light serving as Stokes light with the second light flux serving as pumping light; a focus optical system configured to focus light combined in the combining unit onto a sample; a spectroscope configured to detect light generated from the sample; and a light amount ratio adjusting unit configured to adjust a light amount ratio between the first light flux and the second light flux in the splitting unit based on an intensity a desired band of a spectrum detected in the spectroscope.

In addition, an optical measurement device according to another aspect of the present invention includes: a short pulse laser light source; a splitting unit configured to split emitting light from the short pulse laser light source into a first light flux and a second light flux; an optical fiber configured to generate supercontinuum light from the first light flux; a combining unit configured to combine a long wavelength component of the supercontinuum light serving as Stokes light with the second light flux serving as pumping light; a focus optical system configured to focus light combined in the combining unit onto a sample; a spectroscope configured to detect light generated from the sample; and an adjusting unit configured to adjust a focal point of the Stokes light in the sample based on an intensity of a desired band of a spectrum detected in the spectroscope.

In addition, an optical measurement device according to another aspect of the present invention includes: a short pulse laser light source; a splitting unit configured to split emitting light from the short pulse laser light source into a first light flux and a second light flux; an optical fiber configured to generate supercontinuum light from the first light flux; a combining unit configured to combine a long wavelength component of the supercontinuum light serving as Stokes light with the second light flux serving as pumping light; a focus optical system configured to focus light combined in the combining unit onto a sample; a spectroscope configured to detect light generated from the sample; and an adjusting unit configured to adjust a focal point of the pumping light in the sample based on an intensity of a desired band of a spectrum detected in the spectroscope.

In addition, an optical measurement method according to the present invention includes: splitting emitting light from a short pulse laser light source into a first light flux and a second light flux; coaxially combining a long wavelength component of supercontinuum light generated from the first light flux serving as Stokes light with the second light flux serving as pumping light; and detecting a spectrum generated by focusing combined light onto a sample, wherein, based on an intensity of a desired band of the detected spectrum, at least any of adjustments (1), (2), and (3) is performed:

(1) an adjustment of a light amount ratio between the first light flux and the second light flux, (2) an adjustment of a focal point of the Stokes light in the sample, and (3) an adjustment of a focal point of the pumping light in the sample.

Advantageous Effects of Invention

According to the present invention, a wavenumber band corresponding to a desired substance in a CARS spectrum can be emphasized, and a high signal-to-noise ratio can be obtained.

Problems, configurations, and effects except those described above will be apparent in the description of the following embodiments.

DESCRIPTION OF EMBODIMENTS

Hereinbelow, embodiments of the present invention will be described with reference to the drawings.

Embodiment 1

In the present embodiment, an example of a device which adjusts a ratio between power of pumping light and power entering a photonic crystal fiber and an example of operations therefor will be described.

(Device Configuration)

Figure 7:
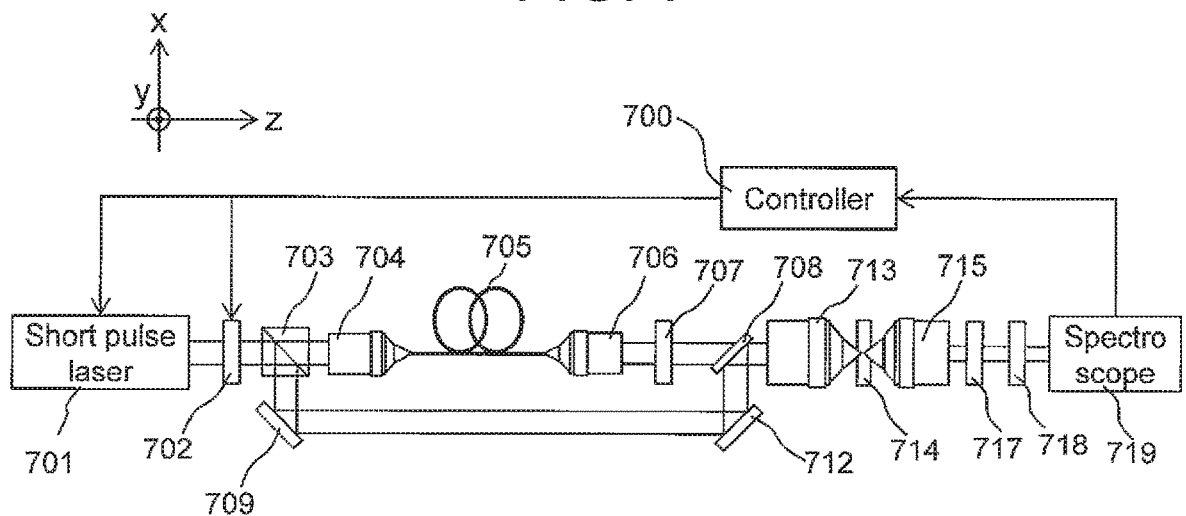
FIG. 7 is a schematic view illustrating a basic configuration of an optical measurement device including a mechanism for adjusting a power branching ratio.

FIG. 7 is a schematic view illustrating a basic configuration of an optical measurement device according to the present embodiment including a mechanism for adjusting a power branching ratio. This device includes mechanism for adjusting a power branching ratio by means of a ½ plate 702 and a polarization beam splitter 703. This adjusting mechanism is operated based on an instruction of a controller 700, which receives a signal from a spectroscope 719. Hereinbelow, respective components will be described in detail.

The controller 700 controls the entire device including the adjusting mechanism and includes interfaces which receive an instruction for measurement from a user and which displays a measurement result. A short pulse laser light source 701 emits short pulse laser light based on an instruction of the controller 700. Examples of the short pulse laser light source 701 are a titanium-sapphire laser, a fiber laser, and a microchip laser, and the pulse width thereof is equal to or less than nanoseconds. Also, the peak power thereof is desirably equal to or greater than the order of kilowatts with which a nonlinear optical effect can be induced. The wavelength thereof may be selected based on the band to be absorbed by a target to be measured and the wavelengths corresponding to the optical components used and can be 800 nm or 1064 nm, for example.

Laser light enters the ½ plate 702 and the polarization beam splitter 703 serving as the mechanism for adjusting a power branching ratio. The ½ plate 702 changes a polarization direction of the laser light based on an instruction of the controller 700, and the polarization beam splitter 703 splits the laser light into transmission components and reflection components at a power branching ratio based on the polarization direction. The transmitted laser light passing through the polarization beam splitter 703 is focused onto an end surface of a photonic crystal fiber 705 by a focus lens 704. A photonic crystal fiber is an optical fiber which has honeycomb cladding formed around a core and strongly confines incident light to the inside of the core. When short pulse laser light enters the photonic crystal fiber, nonlinear optical phenomena, such as self-phase modulation and four-photon mixing, are induced, and supercontinuum light having a broad spectrum is generated. The generated supercontinuum light is collimated by a collimator lens 706 into collimated light, and the short wavelength components of the supercontinuum light are cut by a long-pass filter 707. The supercontinuum light then passes through a dichroic mirror 708, which reflects light having a wavelength equal to the pumping light wavelength and transmits light having another wavelength, and enters an objective lens 713 as Stokes light.

On the other hand, the reflected laser light on the polarization beam splitter 703 is reflected on a mirror 709, a mirror 712, and the dichroic mirror 708 and enters the objective lens 713 as pumping light. The objective lens 713 focuses the broadband Stokes light and the pumping light coaxially combined by the dichroic mirror 708 onto a sample 714. To increase energy density of the Stokes light and the pumping light in the sample 714 and improve the CARS light generation efficiency, the numerical aperture of the objective lens 713 is preferably as high as 0.8 or greater, for example.

In the sample 714, the aforementioned CARS process is induced, and CARS light having a wavelength corresponding to that of a molecular species of the sample 714 is generated. The CARS light becomes collimated light in a collimator lens 715, the transmission components of the pumping light and the Stokes light are cut by a notch filter 717 and a short-pass filter 718, and the CARS light enters the spectroscope 719. The spectroscope 719 detects a CARS spectrum and feeds back the CARS spectrum to the controller 700.

Figure 8:
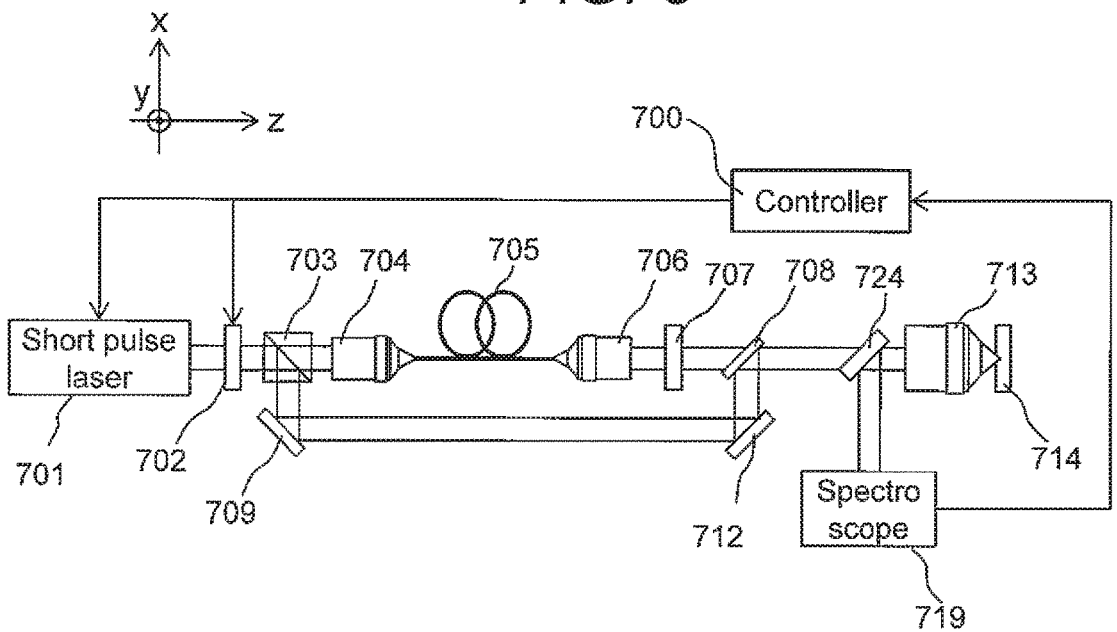
FIG. 8 is a schematic view of an optical measurement device detecting reflective CARS light.

Meanwhile, although the transmissive CARS system for detecting the CARS light which passes in the same direction as the incident directions of the pumping light and the Stokes light has been illustrated in FIG. 7, reflective CARS light may be detected as illustrated in FIG. 8. In this case, the reflective CARS light may be led into the spectroscope 719 with use of a long-pass filter 724, which reflects components having a shorter wavelength than that of the pumping light and which transmits long wavelength components.

Figure 9:
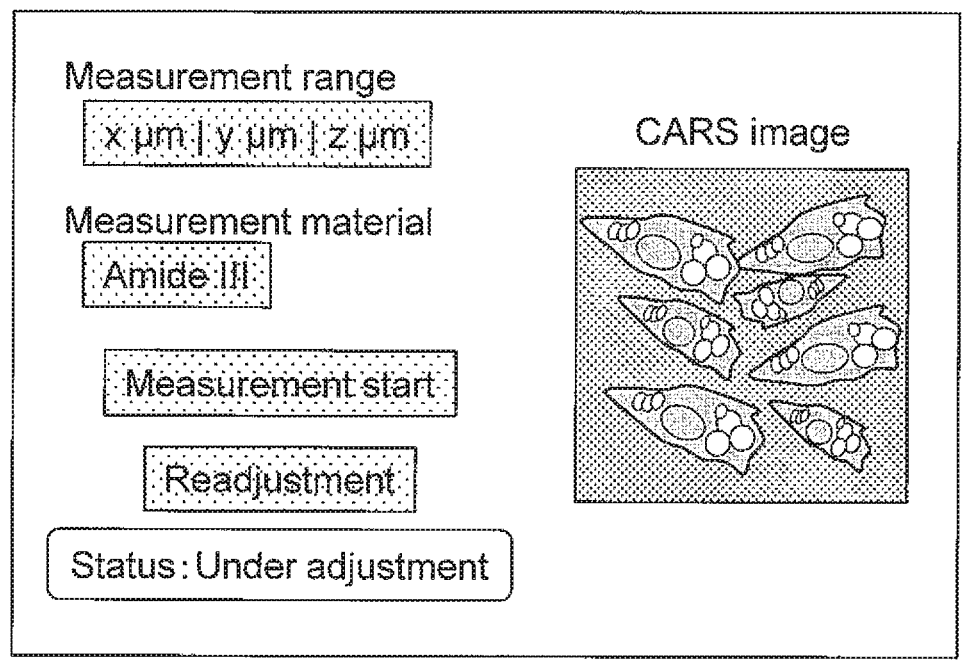
FIG. 9 is a schematic diagram illustrating an example of a user interface.

FIG. 9 is a schematic diagram illustrating an example of a user interface displayed on the controller 700. The user interface receives instructions from the user such as designation of a measurement range, an instruction for measurement start, and an instruction for readjustment and has a function of displaying a status such as "Under adjustment" and a measurement result. It is to be noted that the user interface does not need to be provided on the controller. Control software for a personal computer may be prepared, and the above contents may separately be displayed on a not-illustrated monitor.

(Relationship Between Adjusting Mechanism and CARS Spectrum)

Figure 10:
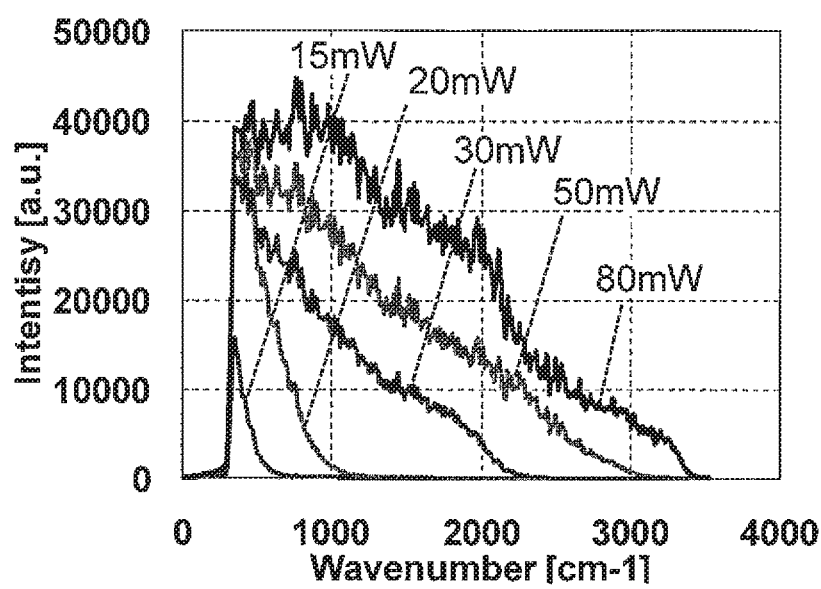
FIG. 10 is a graph illustrating a spectrum of the broadband Stokes light.

The relationship between the mechanism for adjusting a power branching ratio and the CARS spectrum will be described. FIG. 10 is a graph illustrating a spectrum of broadband Stokes light generated by the photonic crystal fiber (hereinbelow abbreviated as the PCF) for each incident power in the PCF. The horizontal axis represents a wavenumber with reference to 1064 nm, which is a wavelength of the pumping light, and the wavenumber directly corresponds to a wavenumber of the generated CARS light. Meanwhile, although the spectrum of supercontinuum light immediately after being emitted from the PCF spreads to a negative wavenumber side as well, the graph illustrates each spectrum after the negative wavenumber side is cut by the long-pass 707.

Each spectrum spreads further as the incident power in the PCF increases. To obtain CARS light with 3000 $cm^{-1}$ or higher, the power of 50 mW or higher is required. Conversely, in a case in which the required wavenumber band of CARS light is 1000 $cm^{-1}$ or lower, the power of 20 mW or higher is required. CARS is one of the nonlinear optical effects, and the signal intensity is proportional to the square of the intensity of the pumping light and the first power of the intensity of the Stokes light. Accordingly, in the system in FIG. 7, in which light from one short pulse laser light source is split into generated light of supercontinuum light and pumping light, the power branching ratio of the two is important for the intensity of CARS light.

Figure 11:
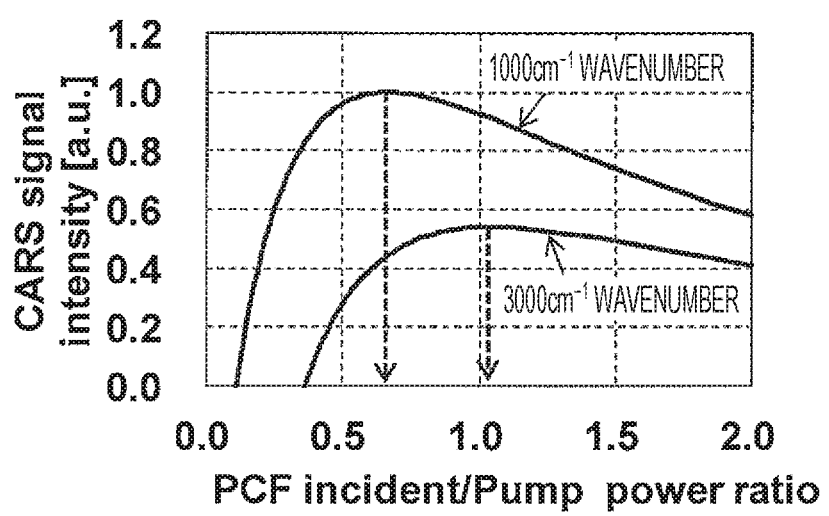
FIG. 11 is a graph illustrating the relationship between a power branching ratio and the intensity of CARS light.

From the characteristics of generation of the supercontinuum light and the CARS light, the relationship between the power branching ratio and the intensity of the CARS light was simulated. In the simulation, the power of the short pulse laser light source was assumed as 200 mW, and the light use efficiency from the short pulse laser light source to the PCF incidence was assumed as 0.75. FIG. 11 is a graph illustrating the relationship between the power branching ratio and the intensity of the CARS light. In a case in which CARS light with 3000 $cm^{-1}$ is required, the incident power in the PCF needs to be higher than that in a case in which CARS light with 1000 $cm^{-1}$ is required. This shows that an optimal branching ratio differs depending on the band of interested CARS light. In the present embodiment, by adjusting the power branching ratio in accordance with a desired wavenumber band, a high signal-to-noise ratio can be obtained.

(Device Operations)

Figure 12:
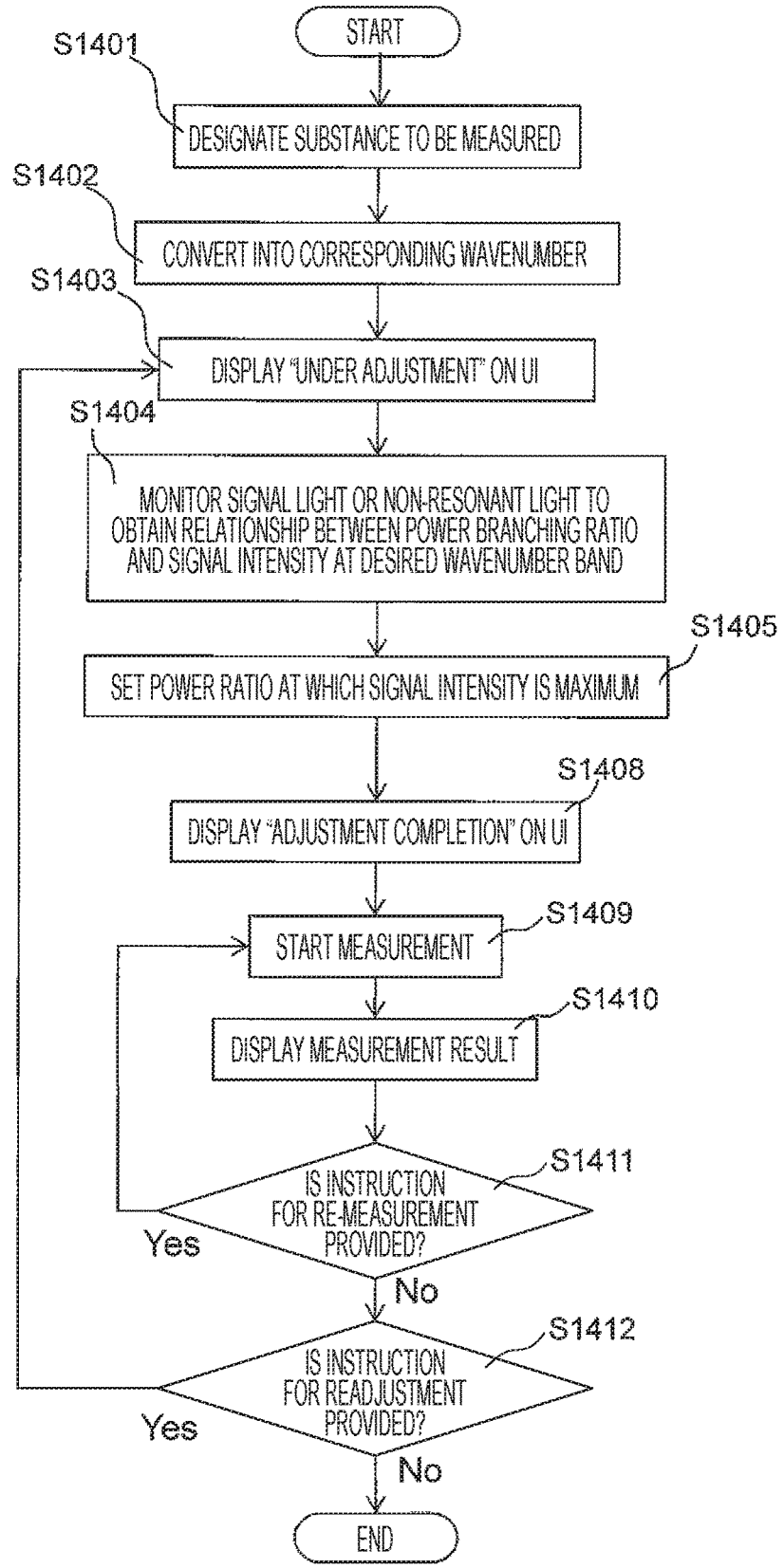
FIG. 12 is a flowchart illustrating an example of processing from reception of designation of a substance to be measured to measurement end.

FIG. 12 is a flowchart illustrating an example of processing of the controller in the optical measurement device from reception of user's designation of a substance to be measured to measurement end. In step S1401, the controller 700 receives designation of a substance to be measured such as Amide I from the user via the user interface. In step S1402, the controller 700 derives a wavenumber of CARS light corresponding to the substance to be measured or converts the wavenumber of CARS light into a wavenumber corresponding to the substance to be measured. For example, in a case in which the substance to be measured is Amide I, the wavenumber is 1650 $cm^{-1}$. In step S1403, the controller 700 displays a message such as "Under adjustment" on the user interface. In step S1404, the controller 700 monitors a signal intensity at the wavenumber determined in step S1402 while changing the power branching ratio by rotating the ½ plate 702 to obtain a relationship between the power branching ratio and the signal intensity. The signal to be used here may be CARS light obtained from the target to be measured or non-resonant light obtained from a medium or the like. In step S1405, the controller 700 sets a power branching ratio at which the signal intensity is maximum based on the relationship derived in step S1404. In step S1408, the controller 700 displays a message of adjustment completion or the like on the user interface. In step S1409, the controller 700 starts measurement. Note that the measurement in this step is to obtain a CARS spectrum or a CARS spectrum image at a designated region.

In step S1410, the controller 700 displays a measurement result on the user interface. In a case in which no instruction for re-measurement is provided from the user in step S1411, the controller 700 checks in step S1412 if an instruction for readjustment is provided from the user. In a case in which no instruction for readjustment is provided, the processing ends. In a case in which an instruction for re-measurement is provided in step S1411, the controller 700 returns to step S1409 to perform re-measurement. Also, in a case in which an instruction for readjustment is provided in step S1412, the controller 700 returns to step S1403 to perform readjustment.

Figure 13:
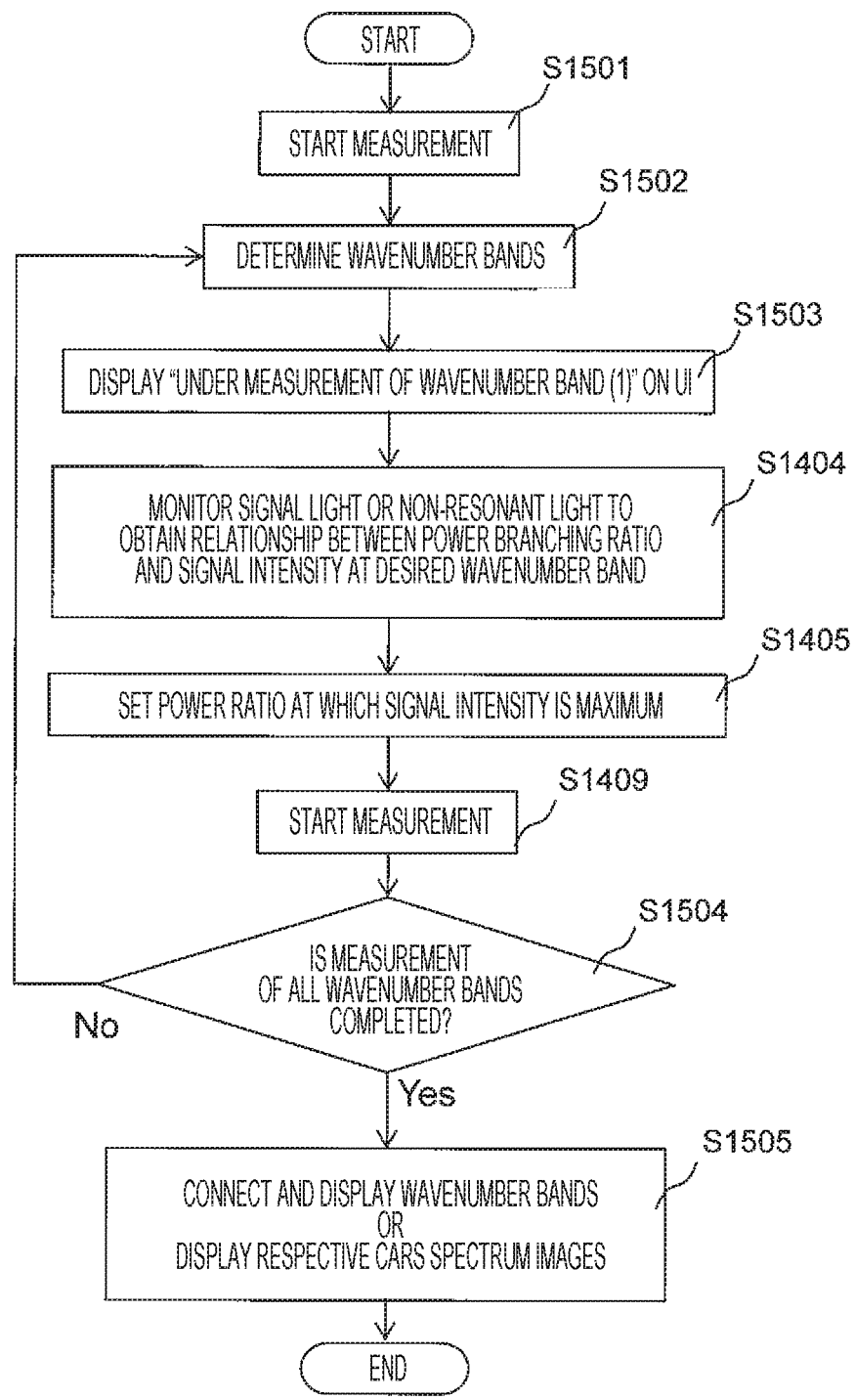
FIG. 13 is a flowchart illustrating an example of processing in which adjustment of the power branching ratio and measurement are performed at a plurality of wavenumber bands, and in which the results are displayed.

In FIG. 12, an example of a flowchart for improving the signal-to-noise ratio at a desired wavenumber band has been illustrated. However, by performing the operation at a plurality of wavenumber bands and connecting the results, the high signal-to-noise ratio can be obtained over the entire wavenumber bands. FIG. 13 is a flowchart illustrating an example of processing in which adjustment of the power branching ratio and measurement are performed at a plurality of wavenumber bands, and in which the results are displayed.

In step S1501, the controller 700 receives an instruction for measurement start without designation of a substance to be measured. In step S1502, the controller 700 determines wavenumber bands for adjustment and measurement. The wavenumber bands for measurement may be determined by equally dividing the entire wavenumber bands to be measured by an arbitrary value, for example. For example, in a case in which a range from 0 to 3000 $cm^{-1}$ is measured, the range may be divided into 0 to 1000 $cm^{-1}$, 1000 to 2000 $cm^{-1}$, and 2000 to 3000 $cm^{-1}$, and each band may be subject to adjustment and measurement from steps S1503 to S1409. In step S1503, the controller 700 displays a message such as "Under measurement of wavenumber band (1)" on the user interface. Steps S1404 to S1409 are similar to those in FIG. 12, and description thereof is thus omitted. In step S1504, the controller 700 checks if measurement of all the divided wavenumber bands has been completed. In a case in which the measurement is not completed, the controller 700 returns to step S1502 and performs adjustment and measurement of the subsequent wavenumber band. In a case in which the measurement of all the bands has been completed based on the determination in step S1504, the controller 700 moves to step S1505 to connect and display the respective measurement spectra measured in step S1409. Accordingly spectra each having a high signal-to-noise ratio can be obtained over the entire wavenumber bands. Also, in a case in which CARS spectrum images are required, the controller 700 displays a list of CARS spectrum images corresponding the respective substances measured in step S1409. Meanwhile, information in step S1404 may be acquired at the time of shipment of the device, and at the time of measurement, adjustment may be performed with use of the information.
(Effects)

Figure 1:
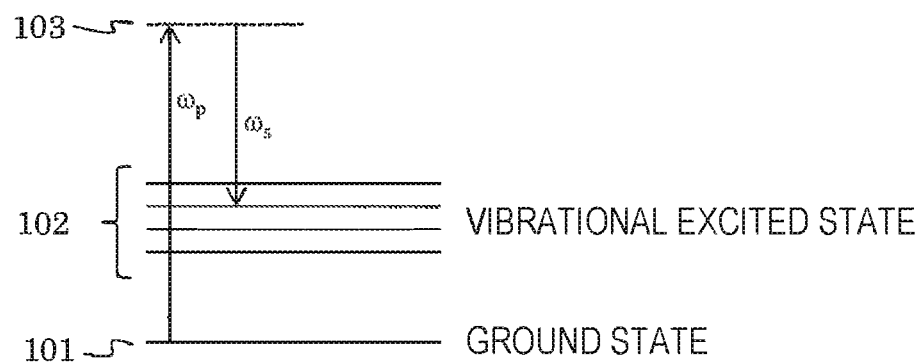
FIG. 1 is an energy level diagram of Stokes scattering in normal Raman scattering.
Figure 2:
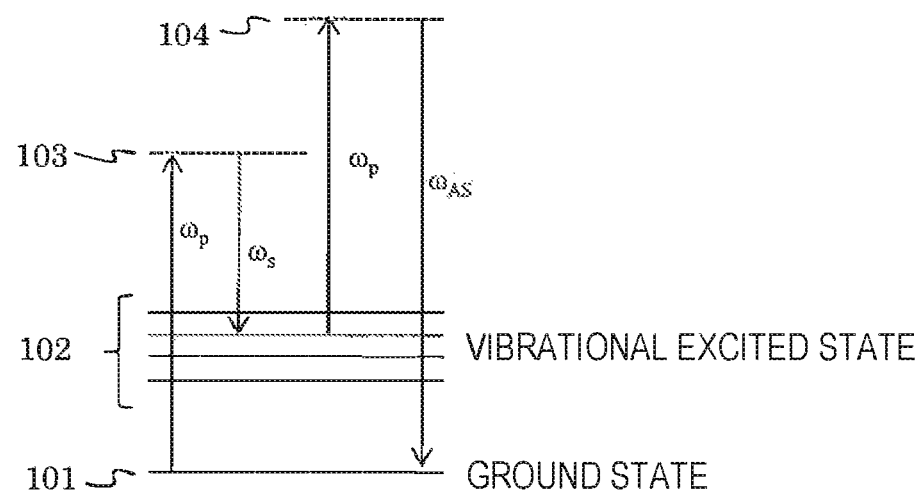
FIG. 2 is an energy level diagram in CARS.
Figure 3:
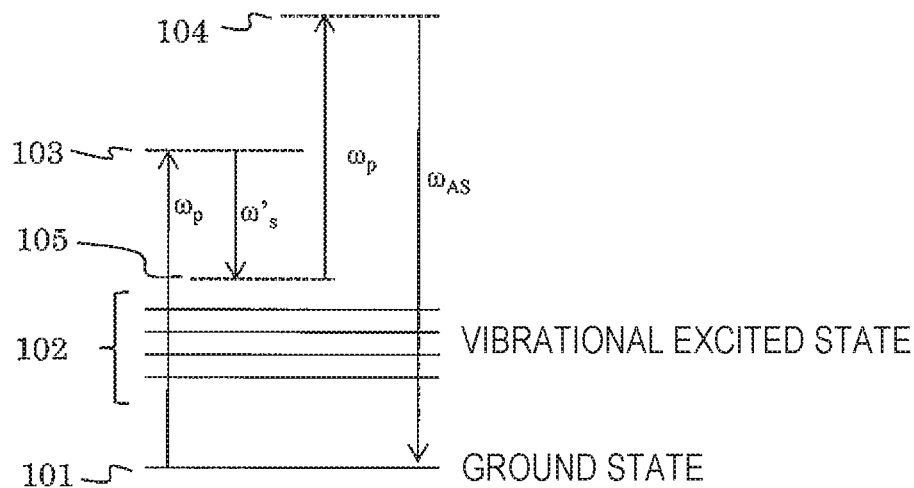
FIG. 3 is an energy level diagram describing an example of non-resonant light in the CARS.
Figure 4:
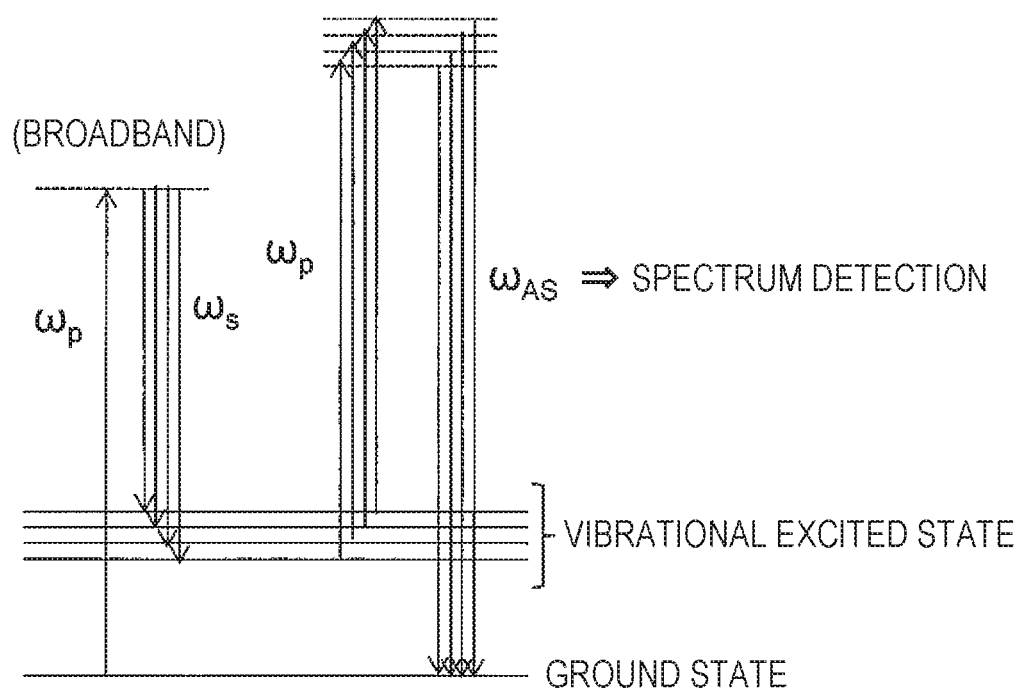
FIG. 4 is an energy level diagram of the CARS in a case in which broadband laser light is used as Stokes light.
Figure 5:
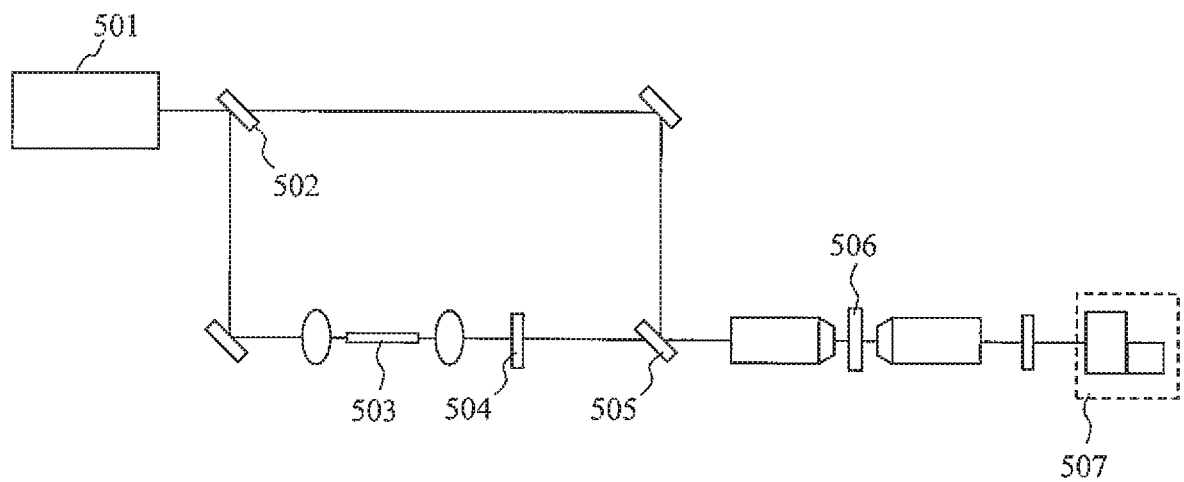
FIG. 5 is a configuration diagram of a conventional multiplex CARS microscope.
Figure 6:
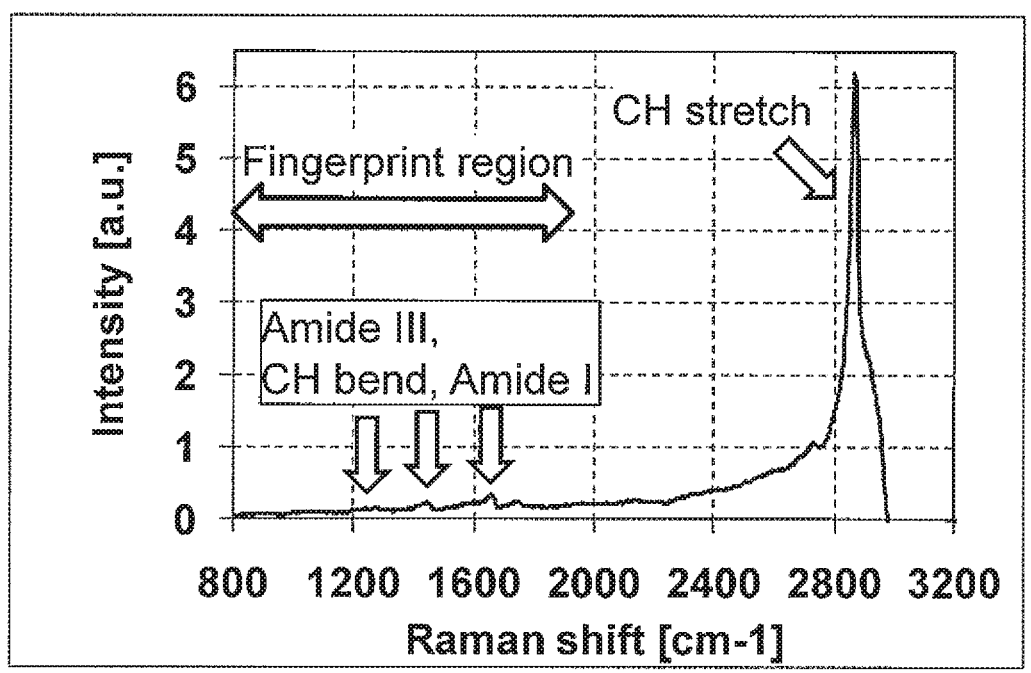
FIG. 6 illustrates a conventional CARS spectrum.
Figure 14:
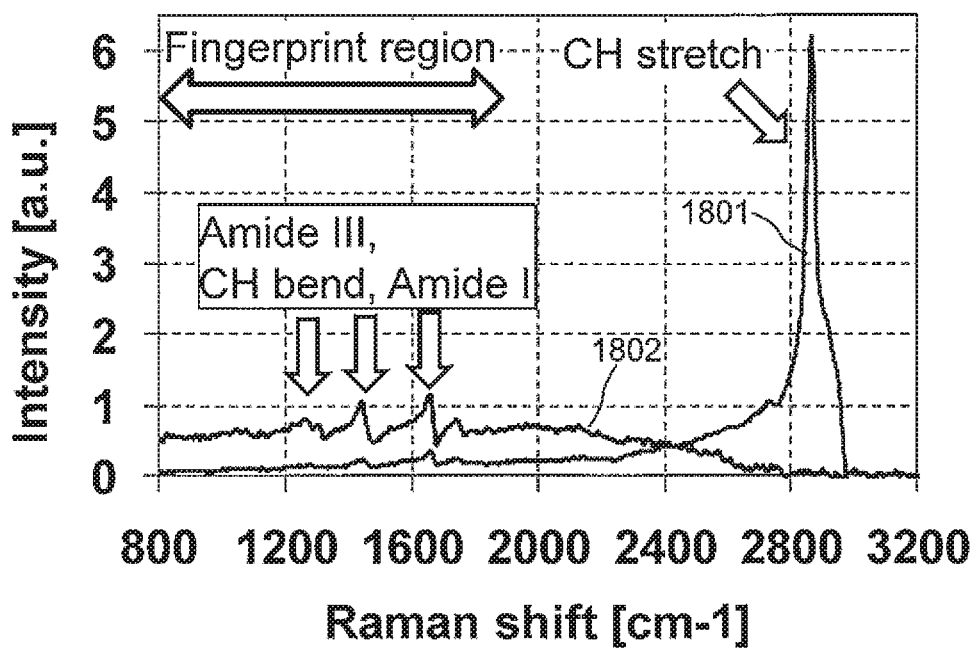
FIG. 14 illustrates an example of improvement of a signal-to-noise ratio in a fingerprint region.

Effects of the present embodiment are illustrated in FIG. 14. FIG. 14 illustrates an example of improvement of the signal-to-noise ratio in a fingerprint region. FIG. 14 also illustrates a spectrum 1801 for the fat cell before adjustment illustrated in FIG. 6. Before the adjustment is performed, the high-intensity signal corresponding to CH stretch around 2900 $cm^{-1}$ is obtained, but signals in the fingerprint region are hardly obtained. On the other hand, a spectrum 1802 is a spectrum for the same position of the same cell as that for the spectrum 1801 obtained by performing adjustment for emphasizing the fingerprint region by means of the device and the adjusting method according to the present embodiment. Due to the adjustment, signals for Amide III, CH bend, Amide I, and the like in the fingerprint region are obtained.

Figure 15:
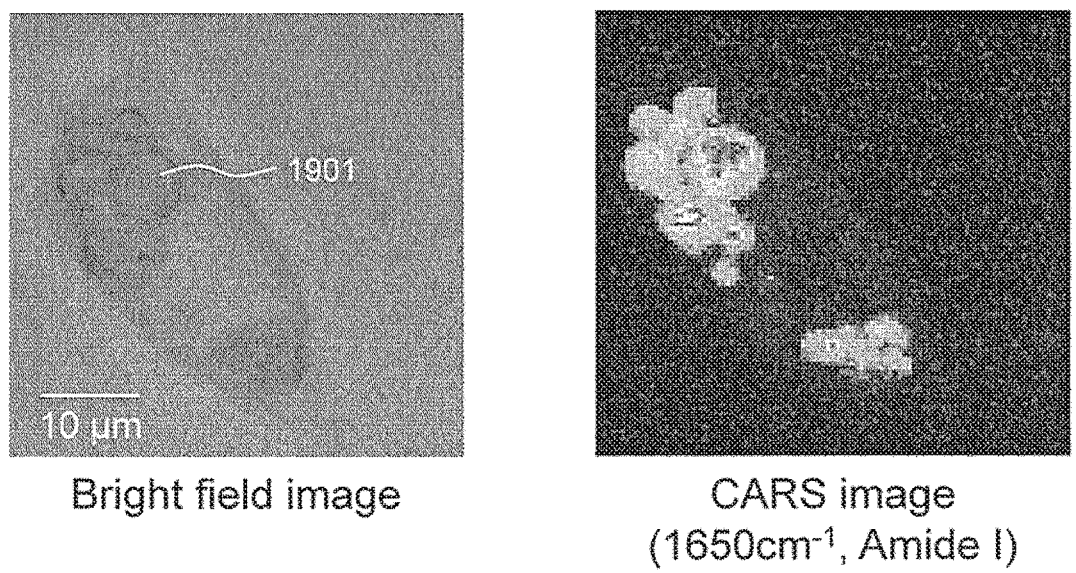
FIG. 15 illustrates a bright field image of a fat cell and a CARS spectrum image.

FIG. 15 illustrates a bright field image of the fat cell and a CARS spectrum image showing spatial distribution of Amide I (1650 $cm^{-1}$) obtained by means of the device according to the present embodiment. According to the present embodiment, the intensity of the CARS image corresponding to a fat droplet 1901 in the cell is high.

According to the present embodiment, with a simple configuration including the wavelength plate and the polarization beam splitter, the broadband Stokes light having a necessary and sufficient wavelength bandwidth can be generated, and appropriate power can be provided to the pumping light. Accordingly, the high signal-to-noise ratio at a desired wavenumber band can be achieved inexpensively and in a short period.

Embodiment 2

In the present embodiment, an example of a device which adjusts focus of the Stokes light and an example of operations therefor will be described. It is to be noted that description of similar contents to those in Embodiment 1 will be omitted.
(Device Configuration)

Figure 16:
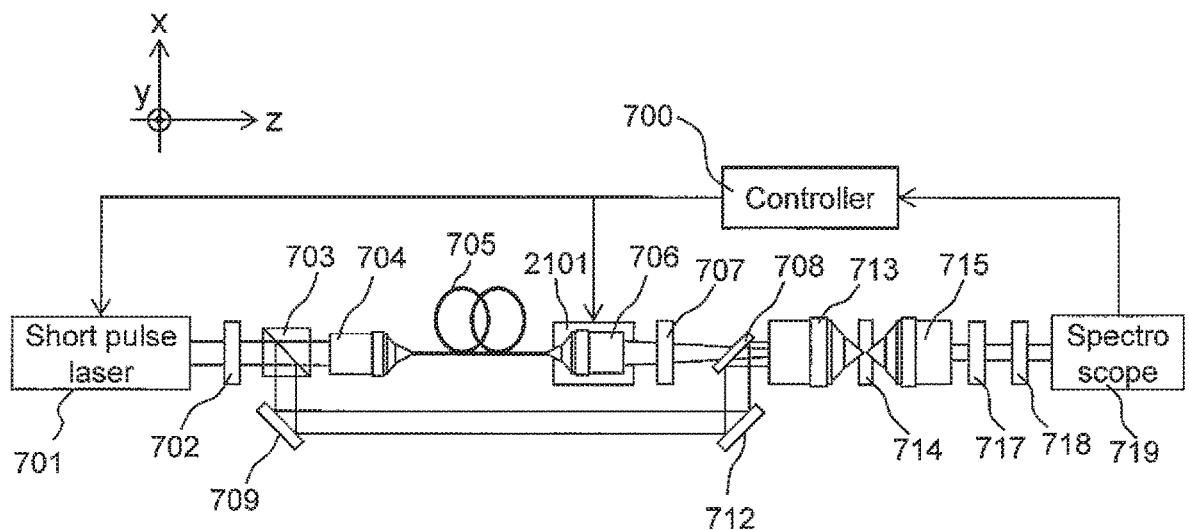
FIG. 16 is a schematic view illustrating a basic configuration example of an optical measurement device including a mechanism for adjusting the divergence/convergence state of supercontinuum light.

FIG. 16 is a schematic view illustrating a basic configuration example of an optical measurement device according to the present embodiment. The device includes as an adjusting unit for adjusting a focal point of Stokes light in a sample a mechanism for adjusting the divergence/convergence state of supercontinuum light by means of the collimator lens 706. The adjusting mechanism is operated based on an instruction of the controller 700, which receives a signal from the spectroscope 719.

The divergence/convergence state of supercontinuum light generated by the PCF 705 is changed by changing a Z position of the collimator lens 706. For adjustment of the Z position of the collimator lens 706, a stage 2101 including a stepping motor, a piezo element, or the like may be used. The short wavelength components of the supercontinuum light are cut by the long-pass filter 707. The supercontinuum light then passes through the dichroic mirror 708, which reflects light having a wavelength equal to the pumping light wavelength and transmits light having another wavelength, and enters the objective lens 713 as Stokes light. In accordance with the divergence/convergence state of the Stokes light when the Stokes light enters the objective lens 713, the focal point of the Stokes light in the Z direction in the sample 714 changes. The other configuration is similar to that in Embodiment 1, and description thereof is thus omitted.
(Relationship Between Adjusting Mechanism and CARS Spectrum)

The relationship) between the mechanism for adjusting the divergence/convergence state of supercontinuum light and the CARS spectrum will be described. The CARS process is one of the nonlinear optical effects, and in a case in which the focal points of the pumping light and the Stokes light in the sample are misaligned, the CARS light generation efficiency drastically decreases. That is, the CARS light is generated only from a region in which the pumping light and the Stokes light focus on the same position.

Figure 17:
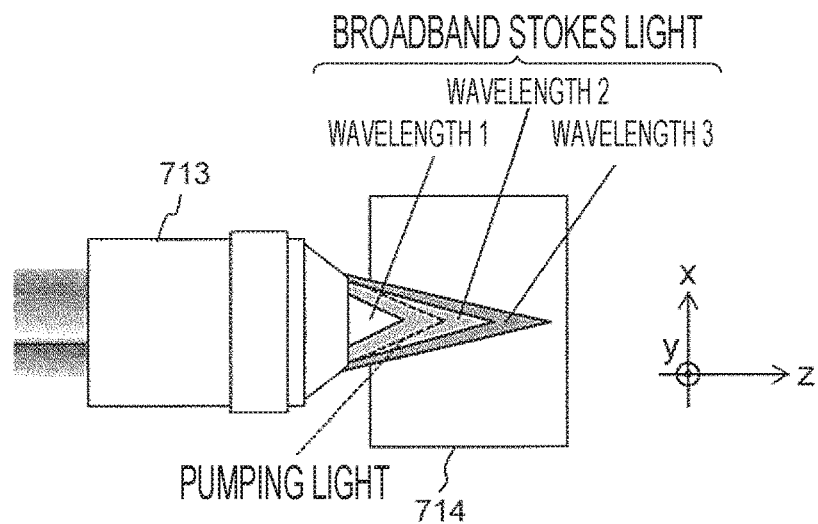
FIG. 17 is a schematic view illustrating a state in which the broadband Stokes light and pumping light focus on a sample by means of an objective lens.

FIG. 17 is a schematic view illustrating a state in which the broadband Stokes light and the pumping light focus on the sample by means of the objective lens. In multiplex CARS, since the Stokes light is broadband, chromatic aberration, in which the focal point changes depending on the wavelength, is generated. Since the wavelength components of the Stokes light whose focal point corresponds to that of the pumping light contribute to generation of the CARS light, the wavelength of the CARS light generated by the combined state of the Stokes light and the pumping light changes, which causes the spectrum to be changed. In the present embodiment, by adjusting the Z position of the collimator lens 706, the divergence/convergence state of the Stokes light changes. By doing so, the focal point of the Stokes light in the sample can be adjusted. By changing the combined state between the Stokes light and the pumping light, the high signal-to-noise ratio at a desired wavenumber band can be obtained. Meanwhile, to facilitate understanding of the description, FIG. 17 illustrates a state in which the broadband Stokes light includes only three kinds of wavelength. However, the broadband Stokes light actually has a continuous spectrum as illustrated in FIG. 10. Also, in FIG. 17, relationship among the beam dimension, the size of the objective lens, and the size of the chromatic aberration differs from the actual one, and the sizes are shown exaggeratingly.

(Device Operations)

Figure 18:
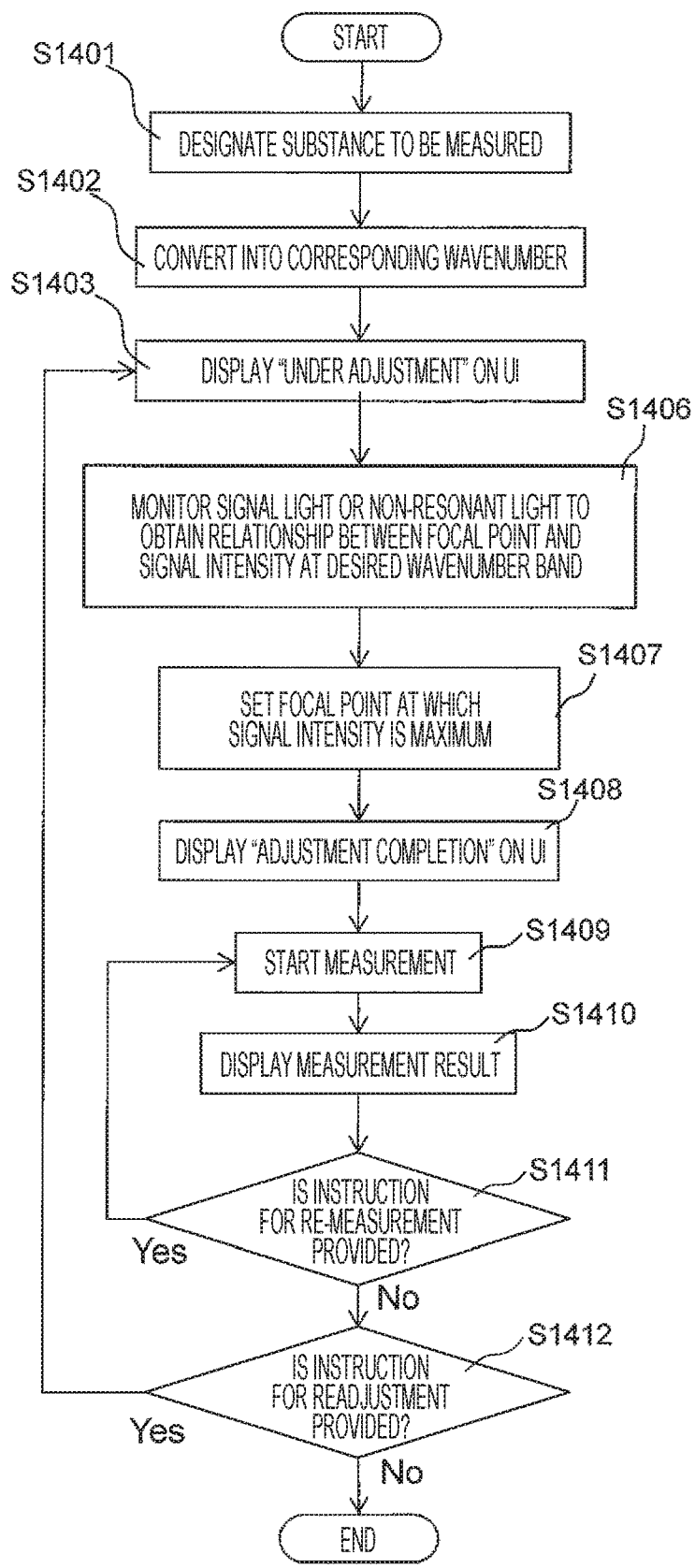
FIG. 18 is a flowchart illustrating an example of processing from reception of designation of a substance to be measured to measurement end.

FIG. 18 is a flowchart illustrating an example of processing from reception of user's designation of a substance to be measured to measurement end. Steps S1401 to S1403 are similar to those in Embodiment 1.

In step S1406, the controller 700 changes the Z position of the collimator lens 706 to change the divergence/convergence state of the Stokes light and to change the focal point of the Stokes light in the sample. The controller 700 monitors a signal intensity at the wavenumber determined in step S1402 while changing the focal point to obtain a relationship between the focal point and the signal intensity. In step S1407, the controller 700 sets a focal point at which the signal intensity is maximum based on the relationship derived in step S1406. Meanwhile, information in step S1406 may be acquired at the time of shipment of the device, and at the time of measurement, adjustment may be performed with use of the information. The subsequent operations are similar to those in Embodiment 1, and description thereof is thus omitted.

Figure 19:
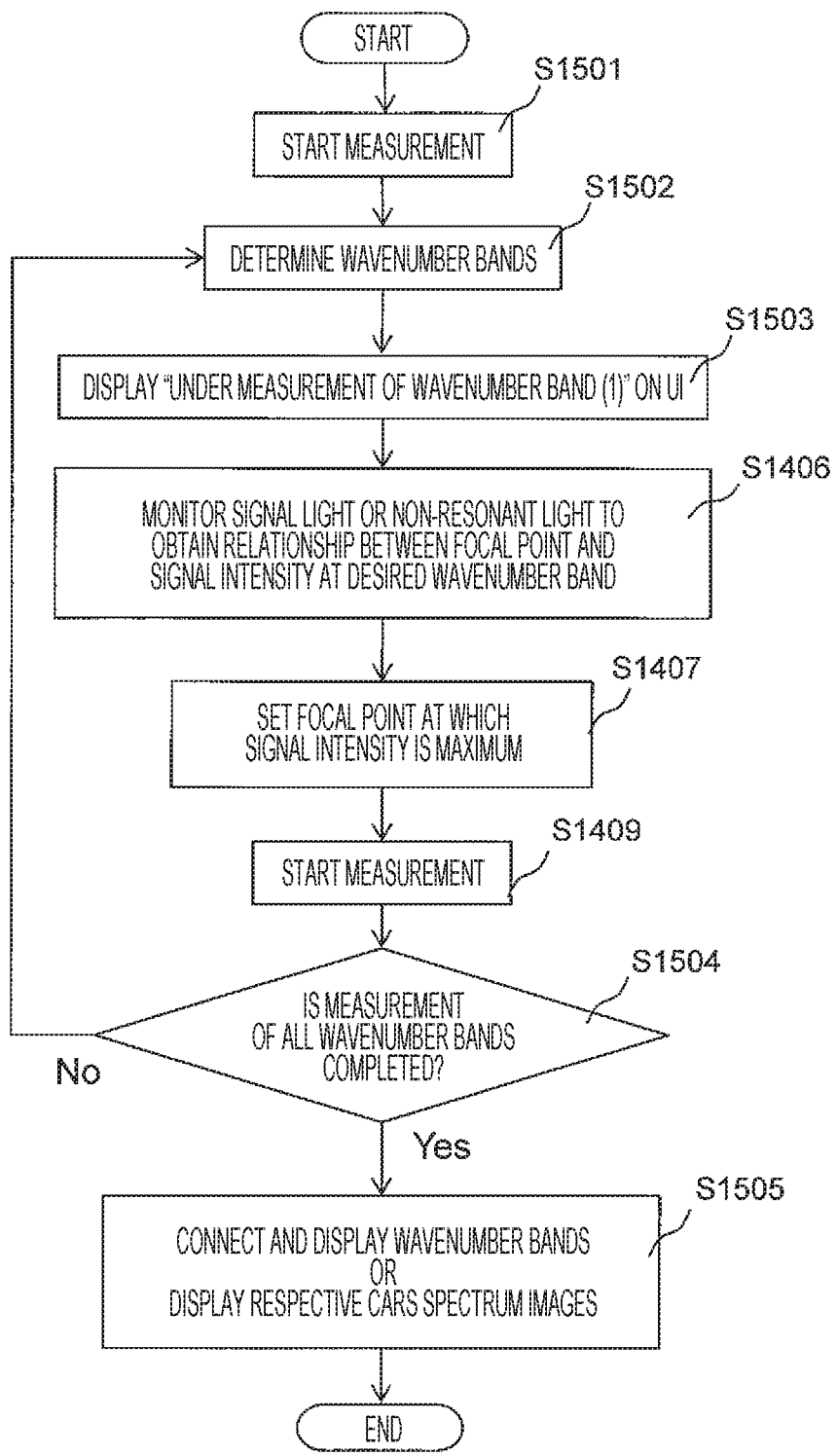
FIG. 19 is a flowchart illustrating an example of processing in which focus adjustment and measurement are performed at a plurality of wavenumber bands, and in which the results are displayed.

In FIG. 18, an example of a flowchart for improving the signal-to-noise ratio at a desired wavenumber band has been illustrated. However, by performing the operation at a plurality of wavenumber bands and connecting the results, the high signal-to-noise ratio can be obtained over the entire wavenumber bands. FIG. 19 is a flowchart illustrating an example of processing in which focus adjustment and measurement of supercontinuum light are performed at a plurality of wavenumber bands, and in which the results are displayed. The flowchart illustrated in FIG. 19 corresponds to a flowchart in which steps S1406 and S1407 in FIG. 18 are substituted for steps S1404 and S1405 of the flowchart illustrated in FIG. 13. The detail of each step is similar to that described above, and description thereof is thus omitted.

(Effects)

According to the present embodiment, with a simple configuration and a simple method in which only the adjustment of the Z position of the collimator lens is performed, the combined state of the broadband Stokes light with the pumping light and the focus state thereof in the sample can be adjusted. Accordingly, the high signal-to-noise ratio at a desired wavenumber band can be achieved inexpensively and in a short period. Meanwhile, although the principle differs from that in Embodiment 1, the phenomenon induced by adjustment is similar. Description of a specific example thereof is thus omitted.

Embodiment 3

In the present embodiment, an example of a device which adjusts focus of the pumping light and an example of operations therefor will be described. It is to be noted that description of similar contents to those in Embodiment 1 will be omitted.

(Device Configuration)

Figure 20:
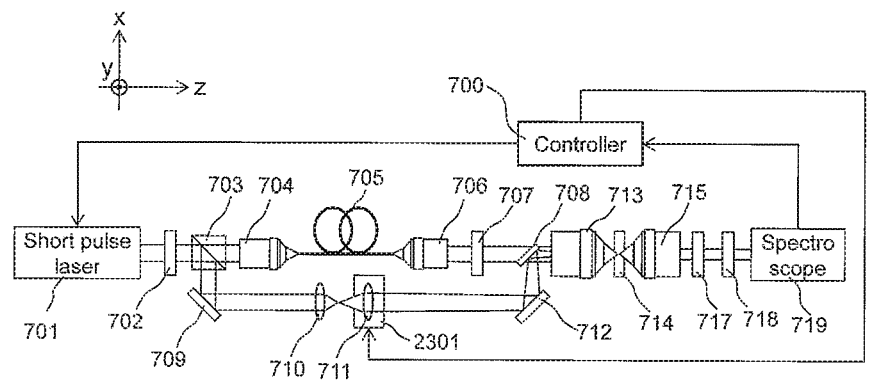
FIG. 20 is a schematic view illustrating a basic configuration example of an optical measurement device including a mechanism for adjusting the divergence/convergence state of the pumping light.

FIG. 20 is a schematic view illustrating a basic configuration example of an optical measurement device according to the present embodiment. The device includes as an adjusting unit for adjusting a focal point of pumping light in a sample a mechanism for adjusting the divergence/convergence state of pumping light by means of the lenses 710 and 711. The adjusting mechanism is operated based on an instruction of the controller 700, which receives a signal from the spectroscope 719.

The lenses 710 and 711 constitute a beam expander, and the divergence/convergence state of laser light is adjusted by relative Z positions of the lenses 710 and 711. For adjustment of the Z positions, a stage 2301 including a stepping motor, a piezo element, or the like may be used. In accordance with the divergence/convergence state of the pumping light when the pumping light enters the objective lens 713, the focal point of the pumping light in the Z direction in the sample 714 changes. The other configuration is similar to that in Embodiment 1, and description thereof is thus omitted.

Figure 21:
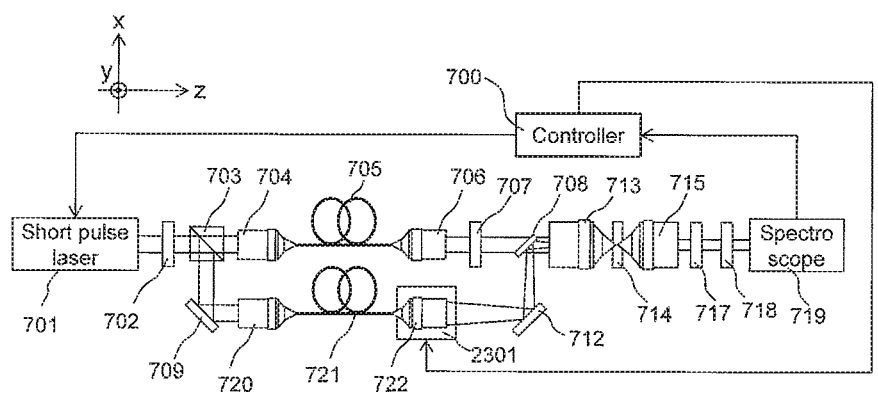
FIG. 21 is a schematic view illustrating an example of an optical measurement device using an optical fiber as an optical path for the pumping light.

Meanwhile, although an example in which the spatial optical system is used to cause the pumping light to pass has been raised in FIG. 20, a fiber optical system including a focus lens 720, an optical fiber 721, and a collimator lens 722 may be used as an optical path for the pumping light to reduce the size of the device as illustrated in FIG. 21. In this case, the divergence/convergence state of the pumping light can be adjusted by adjusting a Z of the collimator lens 722.

Figure 22:
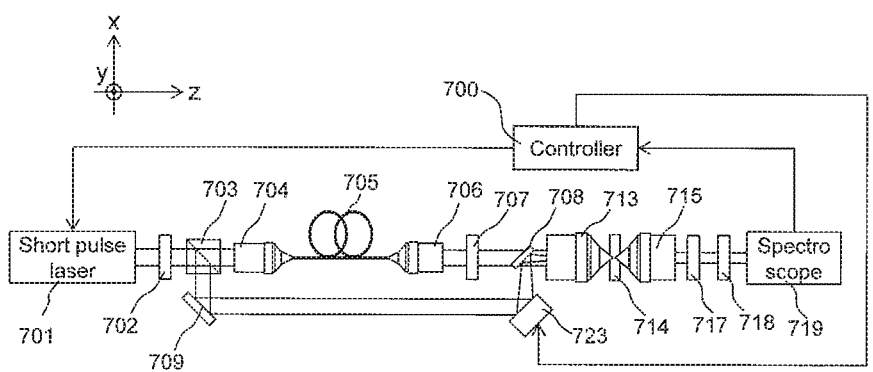
FIG. 22 is a schematic view illustrating an example of an optical measurement device using a spatial phase modulator for adjustment of the divergence/convergence state of the pumping light.

Also, for adjustment of the divergence/convergence state, the lenses do not need to be used. For example, a spatial phase modulator enabling the divergence/convergence state to be controlled by modulating the phase per XY plane position in the beam profile of laser light may be used. FIG. 22 illustrates an example of an optical observation device using a spatial phase modulator for adjustment of the divergence/convergence state of the pumping light. In the example in FIG. 22, a reflective spatial phase modulator is substituted for the lenses 710 and 711 constituting the beam expander and the mirror 712.

(Relationship Between Adjusting Mechanism and CARS Spectrum)

The relationship between the mechanism for adjusting the divergence/convergence state of the pumping light and the CARS spectrum will be described. As described in Embodiment 2, the wavelength of the CARS light generated by the combined state of the Stokes light and the pumping light changes, which causes the spectrum to be changed. In the present embodiment, by changing the divergence/convergence state of the pumping light, the Z focal point of the pumping light changes in FIG. 17. Thus, the wavelength of the Stokes light spatially overlapping with the pumping light in the sample 714 changes, and pending on the combined state, the conditions for generation of the CARS light change.

(Device Operations)

The device operations in the present embodiment are similar to those in Embodiment 2 in FIG. 18. In step S1406, the relative Z positions of the lenses 710 and 711 are changed to change the divergence/convergence state of the pumping light and to change the focal point of the pumping light in the sample. A signal intensity at the wavenumber determined in step S1402 is monitored while the focal point is changed to obtain a relationship between the focal point and the signal intensity. The other operations are similar to those in Embodiment 2, and description thereof is thus omitted.

(Effects)

According to the present embodiment, with a simple configuration and a simple method in which only the adjustment of the Z position of the collimator lens is performed, the combined state of the pumping light with the Stokes light and the focus state thereof in the sample can be adjusted. Accordingly, the high signal-to-noise ratio at a desired wavenumber band can be achieved inexpensively and in a short period. Meanwhile, although the principle differs from that in Embodiment 1, the phenomenon induced by adjustment is similar. Description of a specific example thereof is thus omitted.

Embodiment 4

In the present embodiment, an example of a device which adjusts a ratio between power of the pumping light and power entering the photonic crystal fiber, focus of the pumping light, and focus of the Stokes light and an example of operations therefor will be described. It is to be noted that description of similar contents to those in Embodiment 1 will be omitted.

(Device Configuration)

Figure 23:
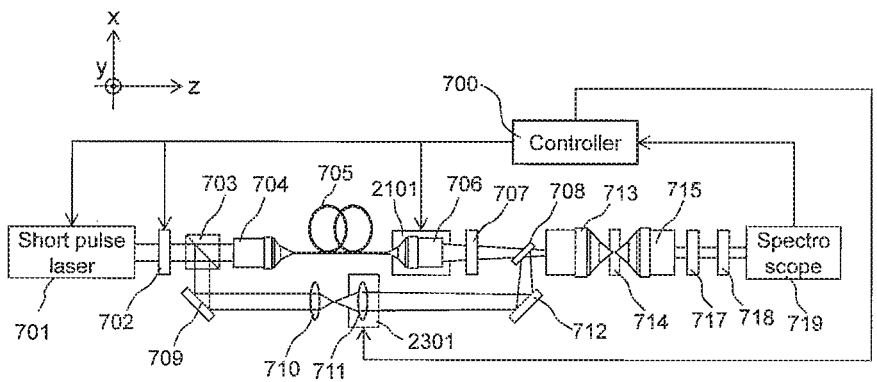
FIG. 23 is a schematic view illustrating a basic configuration example of an optical measurement device including the mechanism for adjusting the power branching ratio and the mechanisms for adjusting the divergence/convergence states of the pumping light and the supercontinuum light.

FIG. 23 is a schematic view illustrating a basic configuration example of an optical measurement device according to the present embodiment. The device includes the mechanism for adjusting the power branching ratio by means of the ½ plate 702 and the polarization beam splitter 703 serving as a first adjusting mechanism, the mechanism for adjusting the divergence/convergence state of the supercontinuum light by means of the collimator lens 706 serving as a second adjusting mechanism, and the mechanism for adjusting the divergence/convergence state of the pumping light by means of the lenses 710 and 711 serving as a third adjusting mechanism. Each of the adjusting mechanisms is operated based on an instruction of the controller 700, which receives a signal from the spectroscope 719. The other configuration is similar to that in Embodiment 1, and description thereof is thus omitted.

(Device Operations)

Figure 24:
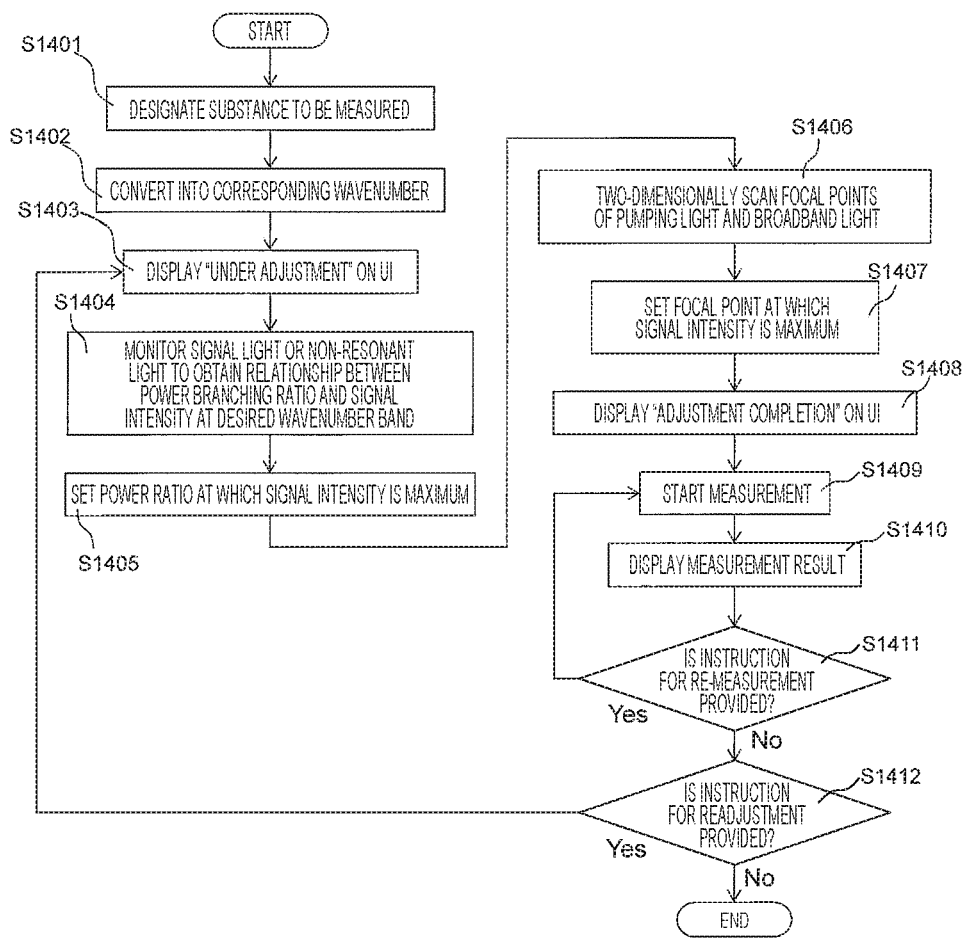
FIG. 24 is a flowchart illustrating an example of processing from reception of designation of a substance to be measured, adjustment of the power branching ratio, and focus adjustment of the pumping light and the supercontinuum light to measurement end.

FIG. 24 is a flowchart illustrating an example of processing from reception of user's designation of a substance to be measured to measurement end. Steps S1401 to S1403 are similar to those in Embodiment 1. In step S1404, the controller 700 obtains a relationship between the power branching ratio and the signal intensity at the wavenumber determined in step S1402 by means of the first adjusting mechanism. The signal to be used here may be CARS light obtained from the target to be measured or non-resonant light obtained from a medium or the like. In step S1405, the controller 700 sets a power branching ratio at which the signal intensity is maximum based on the relationship derived in step S1404.

In step S1406, the controller 700 changes the divergence/convergence state of the pumping light and the divergence/convergence state of the Stokes light by means of the second and third mechanisms to change the focal points of the pumping light and the Stokes light the sample, and the controller 700 two-dimensionally maps the relationship between the respective focal points and the signal intensity. In step S1407, the controller 700 sets a focal point at which the signal intensity is maximum based on the relationships derived in step S1406. In step S1408, the controller 700 displays a message of adjustment completion or the like on the user interface. In step S1409, the controller 700 starts measurement. The subsequent operations are similar to those in Embodiment 1, and description thereof is thus omitted.

Figure 25:
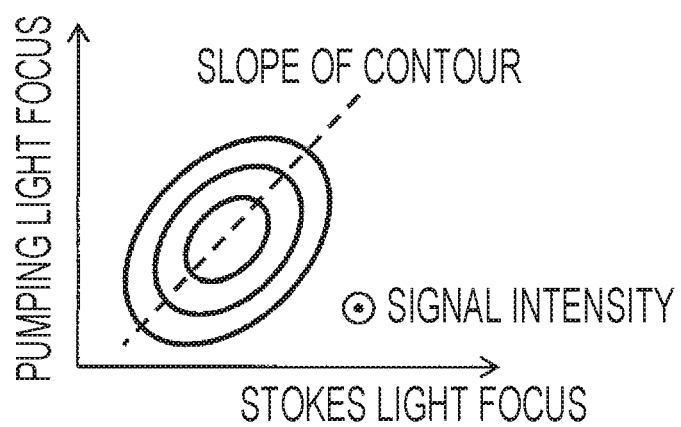
FIG. 25 illustrates an example of a two-dimensional map of pumping light focus and Stokes light focus.
Figure 26:
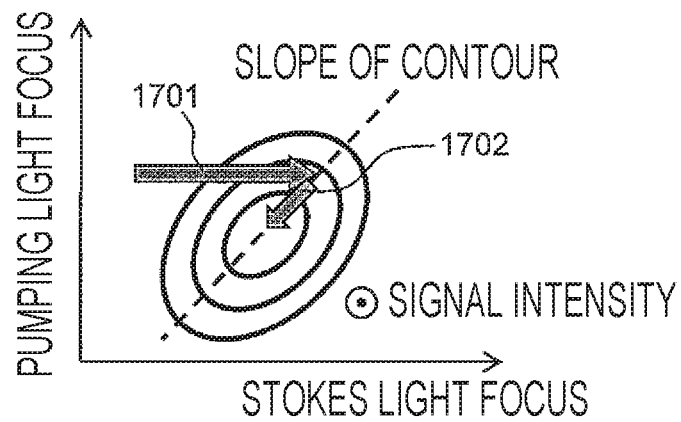
FIG. 26 illustrates an example of a scanning operation at the time of measurement.

Meanwhile, information for adjustment as in steps S1404 and S1406 may be acquired at the time of shipment of the device, and at the time of measurement, adjustment may be performed with use of the information. In particular, in a case in which the two-dimensional scanning of the pumping light and the Stokes light in step S1406 is performed, it may take time to complete the scanning. Thus, for example, a two-dimensional map as illustrated in FIG. 25, which is a result of the two-dimensional scanning, may be obtained at the time of shipment. At the time of measurement, one-axis scanning of the Stokes light focus or the pumping light focus may be performed as illustrated by an arrow 1701 in FIG. 26, and scanning may be performed from the focal point at which the signal intensity is maximum based on a characteristic relationship between the pumping light and the Stokes light such as a slope of a contour as illustrated by an arrow 1702 in FIG. 26 obtained at the time of shipment.

Figure 27:
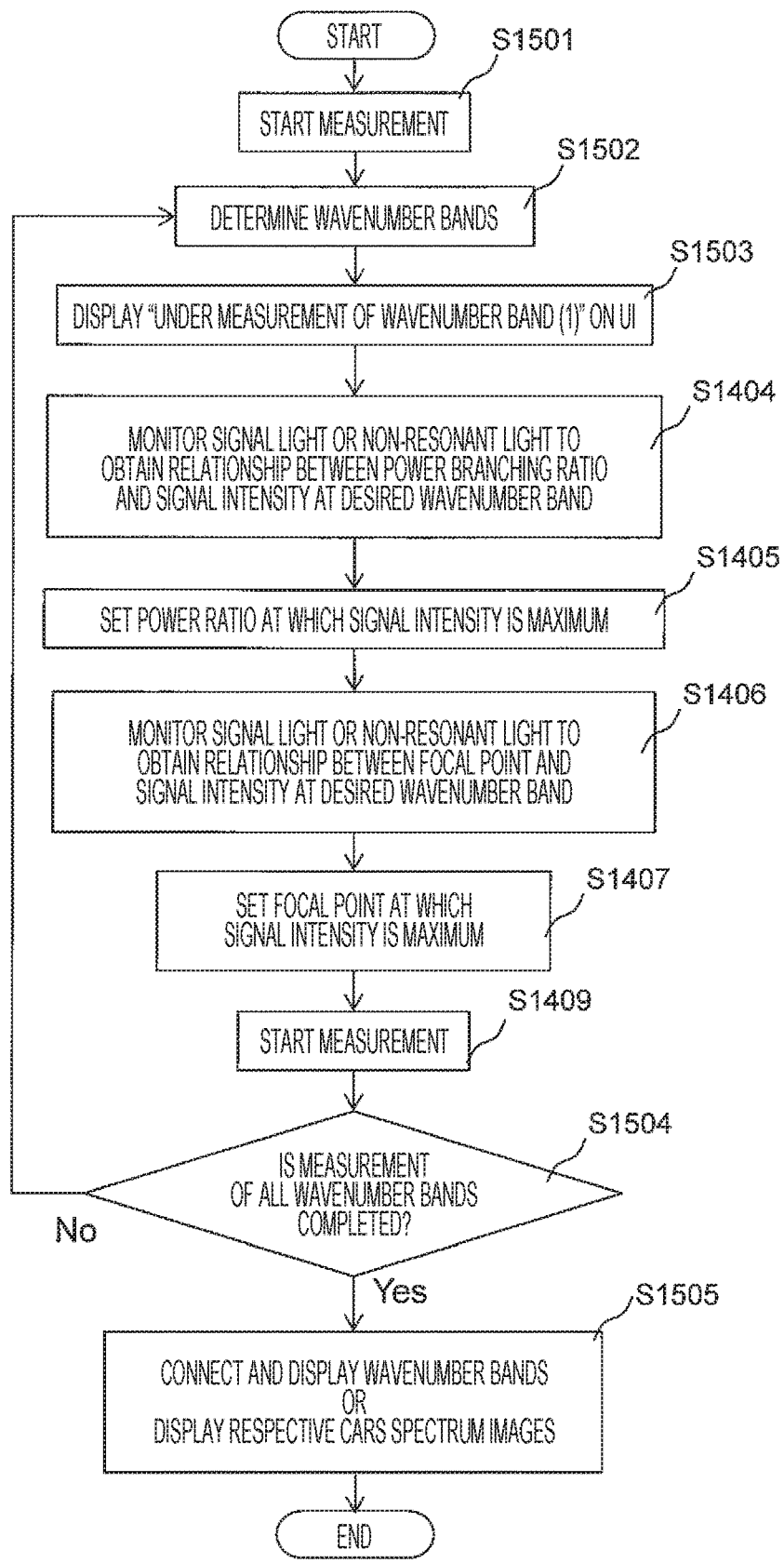
FIG. 27 is a flowchart illustrating an example of processing in which adjustment of the power branching ratio, focus adjustment of the pumping light and the supercontinuum light, measurement, and display or results are performed at a plurality of wavenumber bands.

In FIG. 24, an example of a flowchart for improving the signal-to-noise ratio at a desired wavenumber band has been illustrated. However, by performing the operation at a plurality of wavenumber bands and connecting the results, the high signal-to-noise ratio can be obtained over the entire wavenumber bands. FIG. 27 is a flowchart illustrating an example of processing in which adjustment of the power branching ratio, focus adjustment of the pumping light and the supercontinuum light, measurement, and display of results are performed at a plurality of wavenumber bands. In step S1501, the controller 700 receives an instruction for measurement start without designation of a substance to be measured. The detail of each step is similar to that in Embodiments 1 to 3, and description thereof is thus omitted.

(Effects)

According to the present embodiment, the broadband Stokes light having a necessary and sufficient wavelength bandwidth can be generated, and the combined state and the focus state of the pumping light and the Stokes can be adjusted. Due to such adjustment, the higher signal-to-noise ratio than those in Embodiments 1 to 3 can be achieved. The configuration and the adjusting method according to the present embodiment are significantly effective for acquisition of a spectrum and imaging in a fingerprint region where small signals are densely concentrated. Meanwhile, the phenomenon induced by adjustment is similar to that in Embodiment 1. Description of a specific example thereof is thus omitted.

The present invention is not limited to the foregoing embodiments and includes various modification examples. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

REFERENCE SIGNS LIST 101 molecular ground state
102 vibrational excited state
103 intermediate state
104 intermediate state
105 intermediate state
700 controller
701 short pulse laser light source
702 ½ plate
703 polarization beam splitter
704 focus lens
705 photonic crystal fiber
706 collimator lens
707 long-pass filter
708 dichroic mirror
709 mirror
710 lens
711 lens
712 mirror
713 objective lens
714 sample
715 collimator lens
717 notch filter
718 short-pass filter
719 spectroscope
720 focus lens
721 optical fiber
722 collimator lens
723 spatial phase modulator
724 long-pass filter
1901 fat droplet

The invention claimed is:

1. An optical measurement device comprising:
a short pulse laser light source;
a splitter configured to split emitting light from the short pulse laser light source into a first light flux and a second light flux;
an optical fiber configured to generate supercontinuum light from the first light flux;
a dichroic mirror which combines a long wavelength component of the supercontinuum light serving as Stokes light with the second light flux serving as pumping light;
a focus optical system including an objective lens configured to focus light combined in the dichroic mirror onto a sample;
a spectroscope configured to detect light generated from the sample; and
a movable stage including a motor, a controller, and a collimator lens, the controller-being configured to move the movable stage using the motor to adjust a focal point of the Stokes light in the sample using the collimator lens based on an intensity of a desired band of a spectrum detected in the spectroscope, and to adjust the focal point of the Stokes light using the collimator lens with respect to but without affecting the pumping light so as to change a combined state between the Stokes light and the pumping light.

2. The optical measurement device according to claim 1, comprising:
a second optical fiber configured to cause the second light flux serving as the pumping light to pass.

3. The optical measurement device according to claim 1, wherein the adjustment of the focus position of the Stokes light in the sample is performed by adjusting in a direction of an optical axis a position of a lens provided in an optical path for the Stokes light.

4. The optical measurement device according to claim 1,
wherein the adjustment of the focus position of the Stokes light in the sample is performed at a plurality of wavenumber bands, and
wherein measurement results at the plurality of wavenumber bands are connected and displayed.

* * * * *